United States Patent
Paroni et al.

(10) Patent No.: US 12,488,453 B2
(45) Date of Patent: *Dec. 2, 2025

(54) SYSTEM AND METHOD TO CONTROL THE QUALITY OF A REFLECTOR BODY OF A LAMP FOR MOTOR VEHICLES

(71) Applicant: Marelli Automotive Lighting Italy S.p.A. Con Socio Unico, Tolmezzo (IT)

(72) Inventors: Sara Paroni, Tolmezzo (IT); Marco Svettini, Tolmezzo (IT); Mirco Del Linz, Tolmezzo (IT); Tommaso Fontanot, Tolmezzo (IT)

(73) Assignee: Marelli Automotive Lighting Italy S.p.A. Con Socio Unico, Venaria Reale (IT)

( * ) Notice: Subject to any disclaimer, the term of this patent is extended or adjusted under 35 U.S.C. 154(b) by 386 days.

This patent is subject to a terminal disclaimer.

(21) Appl. No.: 17/533,757

(22) Filed: Nov. 23, 2021

(65) Prior Publication Data

US 2022/0164939 A1    May 26, 2022

(30) Foreign Application Priority Data

Nov. 23, 2020  (EP) ..................... 20209308

(51) Int. Cl.
  *G06K 9/00*  (2022.01)
  *G06T 7/00*  (2017.01)
  (Continued)

(52) U.S. Cl.
  CPC .............. *G06T 7/001* (2013.01); *G06T 17/00* (2013.01); *G06V 10/60* (2022.01); *G06T 2207/30164* (2013.01); *G06T 2207/30248* (2013.01)

(58) Field of Classification Search
  CPC .......... G06V 10/60; G06T 2207/30248; G06T 2207/20224
  See application file for complete search history.

(56) References Cited

U.S. PATENT DOCUMENTS 6,668,078 B1 * 12/2003 Bolle ..................... G06T 7/174
                                                    356/240.1
2022/0163447 A1 * 5/2022 Paroni .................... G01N 21/55

FOREIGN PATENT DOCUMENTS

DE           4001449 A1 *  7/1991
JP      H10 142161 A      5/1998
(Continued)

OTHER PUBLICATIONS

European Seach Report dated Apr. 22, 2021 for European Application No. 20209308.

*Primary Examiner* — Molly Wilburn
*Assistant Examiner* — Aiden Keup
(74) *Attorney, Agent, or Firm* — McCarter & English, LLP

(57) ABSTRACT

A control system to control the quality of at least one reflector body of a lamp of a motor vehicle, comprising a light source, which is designed to emit a first light beam to irradiate the reflecting surface of the reflector body; an image capturing apparatus, which is arranged so as to capture a series of images) containing the irradiated reflecting surface of the reflector body; a processing device, which is configured so as to process the images), in order to determine the actual reflectance of the reflector body, and so as to determine a quality condition of the reflector body to be validated based on the actual reflectance.

8 Claims, 7 Drawing Sheets

(51) Int. Cl.
 *G06T 17/00* (2006.01)
 *G06V 10/60* (2022.01)

(56) References Cited

FOREIGN PATENT DOCUMENTS

JP 2003028755 A * 1/2003
KR 100340294 B1 * 6/2002

\* cited by examiner

SYSTEM AND METHOD TO CONTROL THE QUALITY OF A REFLECTOR BODY OF A LAMP FOR MOTOR VEHICLES

CROSS-REFERENCE TO RELATED APPLICATIONS

This patent application claims priority from European Patent Application No. 20209308.4, filed on Nov. 23, 2020, the entire disclosure of which is incorporated herein by reference.

TECHNICAL FIELD

The invention relates to the control of the quality of a reflector body of a lamp for motor vehicles.

BACKGROUND ART

The optical structures of the reflecting bodies of the lamps for motor vehicles were subjected, over the years, to many changes in terms of shapes and geometries, which led to a progressive increase in the manufacturing complexity thereof.

In modern lamps, indeed, the reflector is, together with the light source and the control electronics, a component with a high structural complexity, which needs to fulfil given condition in order to allow the lamp to work correctly.

To this aim, in current lamp production systems, an "in-line" quality validation is generally carried out in order to check whether the reflector meets predetermined quality requirements, so that it can be rejected in case they are not fulfilled.

This process is currently carried out by an operator who is responsible for the control and checks for the presence of constructive faults and/or imperfections and/or non-compliances through direct observation of the reflector irradiated by a light source.

The aforesaid validation process, besides being subjected to errors as well as significant implementation costs and times, has a level of accuracy in the control of the quality of the reflector that can change based on numerous variants, which, in turn, basically depend on the person carrying out the control.

The failed identification of a reflector that "does not comply" with the predetermined quality parameters often leads, following the assembly of the lamp, to the rejection of the entire lamp, a condition that significantly affects the overall production costs of the lamps.

SUMMARY—DISCLOSURE OF INVENTION

Therefore, the object of the invention is to provide a quality control system and method, which overcome the technical drawbacks described above and, in particular, allow manufacturers to check, in a completely automatic manner, namely with no need for inspections to be carried out by operators, for the presence or the lack of a predetermined quality condition of the reflector, so as to reject it and, hence, promptly remove it from the production line.

This object is reached by the invention in that it relates to a system to control the quality of at least one reflector body of a lamp of a motor vehicle, wherein the control system is characterized in that it comprises a validation system to validate the quality of the reflector body comprising: at least one first light source, which is designed to emit a first predetermined light beam to irradiate the reflecting surface of said reflector body, an image capturing apparatus, which is arranged so as to capture one or more first images containing the irradiated reflecting surface of said reflector body, a processing device, which is configured so as to: process said one or more first images in order to determine the actual reflectance of the reflector body to be validated, determine a quality condition of said reflector body to be validated based on said actual reflectance.

The invention further relates to a method to control the quality of at least one reflector body of a lamp of a motor vehicle, wherein the method comprises a validation method to validate the quality of the reflector body comprising: providing at least one first light source, which is designed to emit a first predetermined light beam to irradiate the reflecting surface of said reflector body, capturing, by means of an image capturing apparatus, one or more first images containing the irradiated reflecting surface of said reflector body, processing said one or more first images in order to determine the actual reflectance of the reflector body to be validated, determining a quality condition of said reflector body to be validated based on said actual reflectance.

Preferably, the method further entails determining said quality condition of the reflector body based on a comparison between said actual reflectance and a reference reflectance.

Preferably, the method entails storing a first proportionality parameter, determining the actual luminance of said reflector body to be validated based on the processing of said first images, determining said actual reflectance of said reflector body based on said actual luminance and on said first proportionality parameter.

Preferably, the method entails carrying out a digital removal operation to remove, from said one or more first images, a first luminance component associated with said first light source, so as to determine said actual luminance.

Preferably, the method further comprises an calibration method comprising the steps of: providing a sample reflector body, providing at least one second light source, which is designed to emit a predetermined light beam so as to irradiate said sample reflector body, capturing, by means of an image capturing apparatus, one or more second images containing the irradiated reflecting surface of said sample reflector body, processing said one or more second images by means of a processing device in order to determine said reference reflectance and said first proportionality parameter.

Preferably, the calibration method further comprises determining a reference luminance based on said one or more second images, determining said reference reflectance based on said reference luminance.

Preferably, the calibration method comprises the step of carrying out a digital removal operation to remove, from said one or more second images, a first luminance component associated with said second light source, so as to determine said reference luminance.

Preferably, the calibration method further comprises the step of determining said reference reflectance through the implementation of a simulation program simulating the optical behaviour of a virtual three-dimensional model of said sample reflector body based on said reference luminance and on the second light beam emitted by said second light source.

Preferably, the validation method comprises the steps of: storing a second proportionality parameter, determining the actual light intensity of said reflector body to be validated based on the processing of said one or more first images, determining said actual reflectance of said reflector body to be validated based on said actual light intensity and on said second proportionality parameter.

Preferably, the validation method further comprises the step of carrying out a digital removal operation to remove, from said one or more first images, a first intensity component associated with said first light source, so as to determine said actual intensity.

Preferably, the calibration method further comprises the steps of: providing a sample reflector body, providing at least one second light source, which is designed to emit a predetermined light beam so as to irradiate said sample reflector body, capturing, by means of an image capturing apparatus, one or more second images containing the irradiated reflecting surface of said sample reflector body, processing said one or more second images in order to determine said reference reflectance and said second proportionality parameter.

Preferably, the calibration method entails determining a reference intensity based on said one or more second images, determining said reference reflectance based on said reference intensity.

Preferably, the calibration method further comprises the step of carrying out a digital removal operation to remove, from said one or more second images, a first intensity component associated with said second light source, so as to determine said reference intensity.

Preferably, the calibration method comprises the steps of determining said reference reflectance through the implementation of a simulation program simulating the optical behaviour of a virtual three-dimensional model of said sample reflector body based on said reference intensity and on the second light beam emitted by said second light source.

BRIEF DESCRIPTION OF THE DRAWINGS

The invention will now be described with reference to the accompanying drawings, showing a non-limiting embodiment thereof, wherein.

DETAILED DESCRIPTION—BEST MODE FOR CARRYING OUT THE INVENTION

The invention will now be described in detail with reference to the accompanying figures, so as to allow a person skilled in the art to carry it out and to use it. Possible changes to the embodiments described will be immediately evident to skilled people and the generic principles described can be applied to other embodiments and applications without for this reason going beyond the scope of protection of the invention as it is defined in the appended claims.

Therefore, the invention cannot be considered as limited to the embodiments described and shown herein, but it has to be associated with the widest scope of protection possible in accordance with the principles and the features set forth and claimed herein.

As described in detail below, the invention is basically based on the idea of directly determining the reflectance value of a reflector body to be validated, based on the direct determination of a photometric quantity indicative of the light reflected by the reflector to be validated and on a proportionality parameter, wherein the proportionality parameter is determined, in turn, through the execution of a calibration process.

The photometric quantity may preferably comprise luminance, to which explicit reference will be made in the description below. However it is understood that the photometric quantity may comprise photometric quantities alternative to luminance, such as for example light intensity.

The calibration process entails implementing a process for the analysis of the images of a sample reflector body irradiated by a predetermined light source, so as to determine a reference luminance exclusively deriving from the sample reflector body, and executing a simulation program simulating a virtual 3D model of the sample reflector body, so as to determine the reflectance value that should characterize the virtual model of the reflector body in order to allow the latter to have a luminance value corresponding to the reference luminance previously determined on the physical sample reflector.

The Applicant found out that the preventive determination of the proportionality parameter between reflectance and luminance during the calibration method has the technical effect of allowing manufacturers to control and, hence, validate, in an automatic, quick and accurate manner, the quality of any reflector body to be validated which is of the same type as the sample reflector, based on the determination of the luminance of the reflectors to be validated, a solution that can be adopted, in line, by means of a particularly simple and economic validation system.

Figure 1:
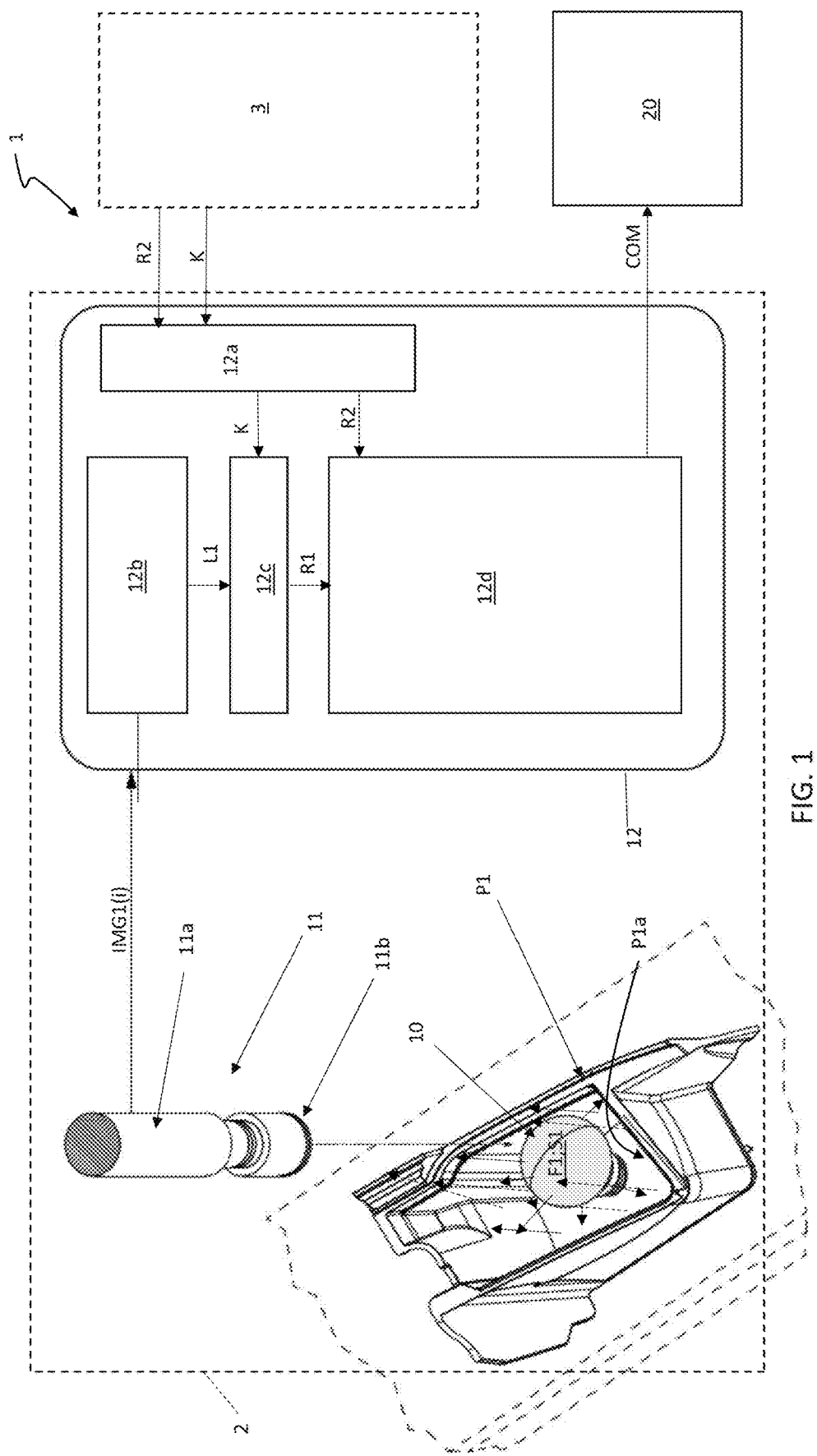
FIG. 1 schematically shows a system to control the quality of a reflector body of a lamp of a motor vehicle according to the invention, FIG. 2 schematically shows an adjustment system present in the quality control system shown in FIG. 1, FIG. 3 schematically shows an example of the application of the reflector quality control system to a production line transporting the reflectors.
Figure 3:
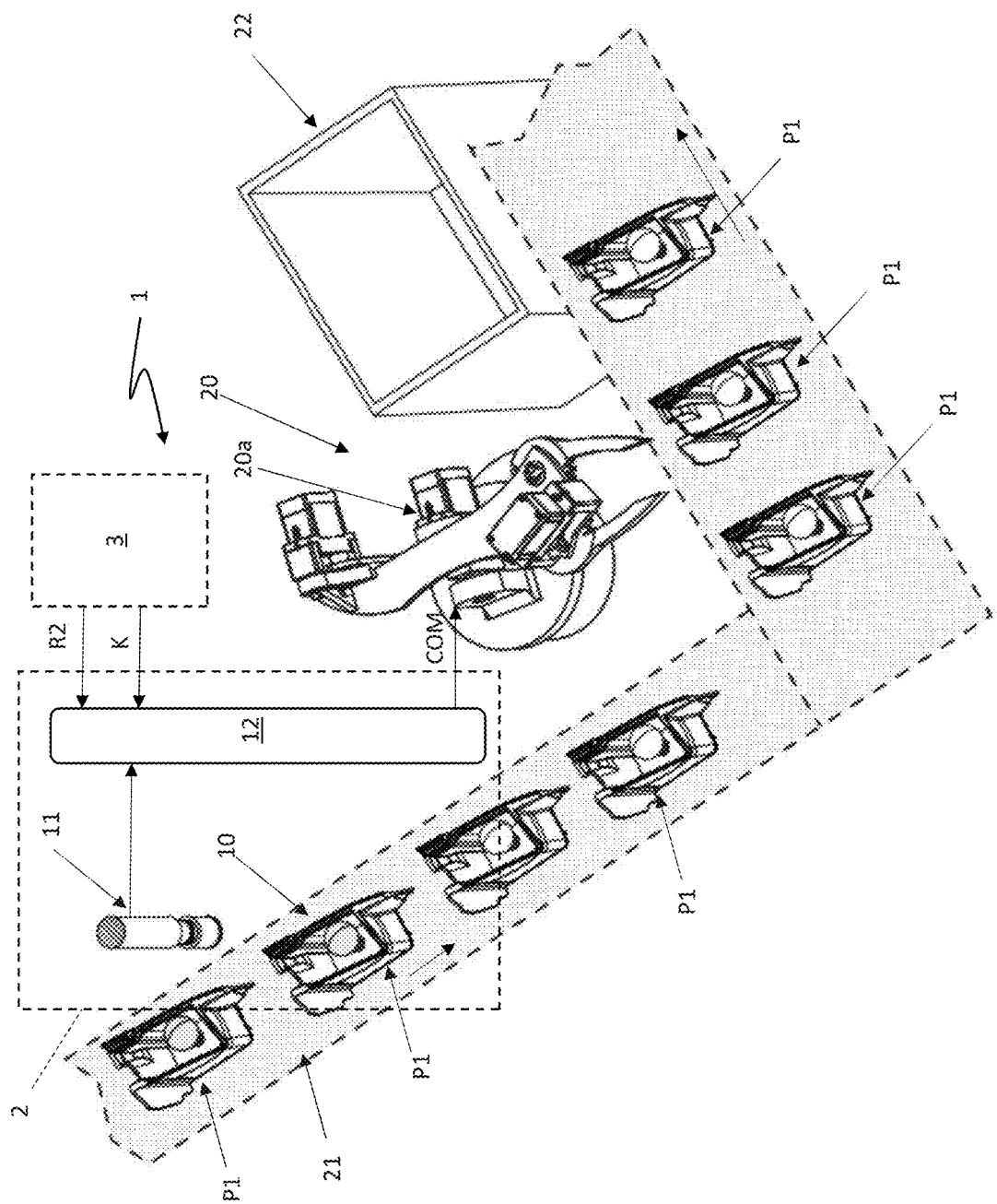

With reference to FIGS. 1 and 3, number 1 schematically shows, as a whole, s system to control the quality of a reflector body P1 to be validated of a lamp (not shown) of a motor vehicle (not shown).

In the description below, the term reflector body P1 explicitly indicates, without because of this losing in generality, a reflector body having a shape that is similar to that of a (three-dimensional) hull or half-shell and made of a polymer material, on whose inner surface (which is the one reflecting the light beam irradiated by the light source mounted in the lamp) a metallized reflecting layers is applied, which is formed, for example, by a film of metal material, such as aluminium or similar materials.

Figure 2:
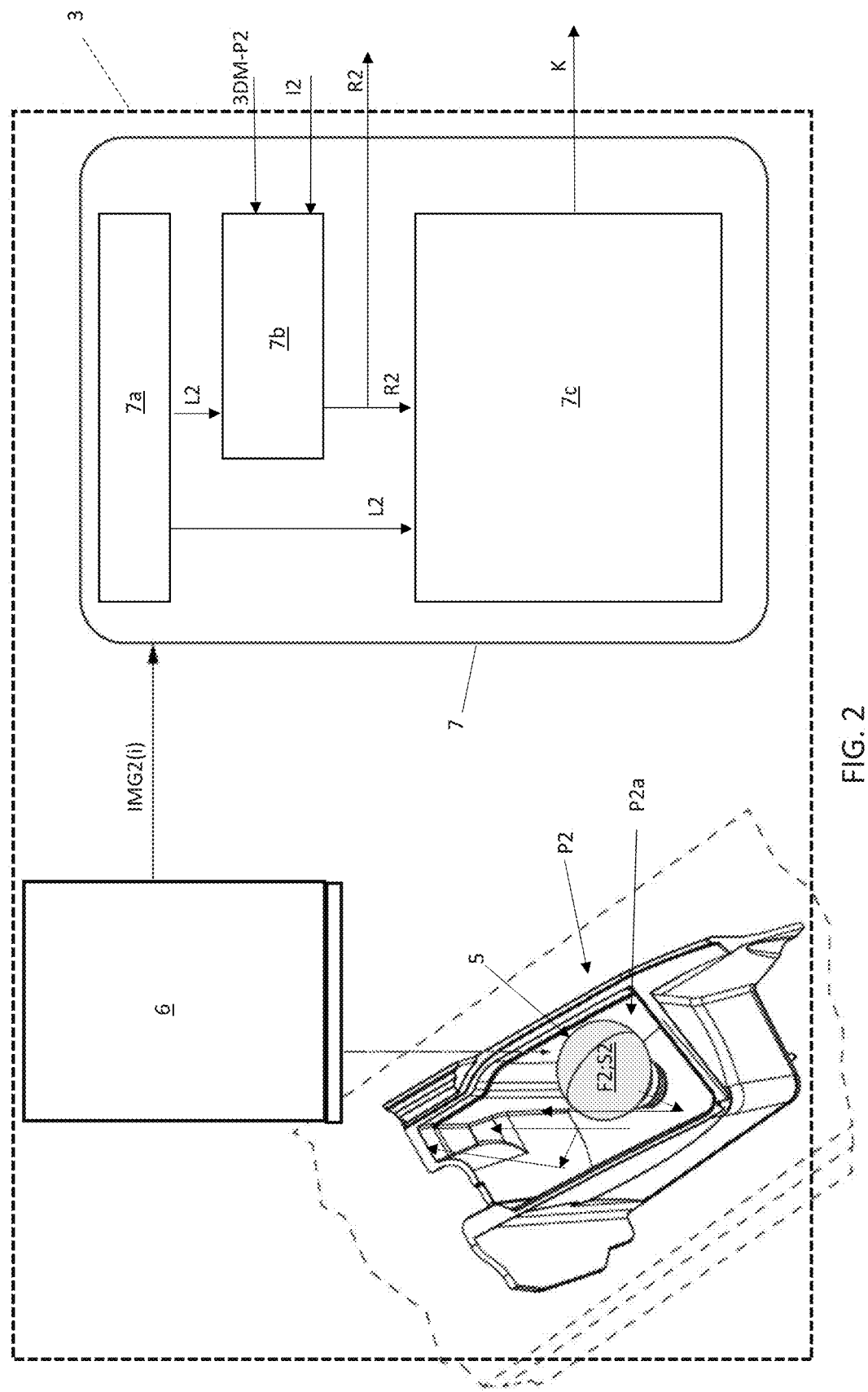

With reference to FIGS. 1, 2 and 3, the quality control system 1 comprises a validation system 2 and a calibration system 3.

As described in detail below, the validation system 2 is configured to automatically determine whether a reflector body P1 to be validated fulfils or fails to fulfil a quality condition. According to the invention, the quality condition of the reflector body P1 to be validated is fulfilled or fails to be fulfilled based on the reflectance value R1 of the reflector body P1 to be validated.

According to the invention, the reflectance R1 of the reflector body P1 to be validated is determined by the validation system 2 in an indirect manner, namely based on a photometric quantity preferably corresponding to the luminance L1 of the reflector body P1 to be validated and on the aforesaid proportionality parameter, hereinafter referred to as proportionality parameter K.

Preferably, the quality condition is determined by the validation system 2 based on a comparison between the reflectance R1 of the reflector body P1 to be validated and the above-mentioned reference reflectance, hereinafter indicated with R2 and associated with the sample reflector P2.

With reference to FIGS. 1 and 3, the calibration system 3 is designed to determine the reference reflectance R2 and the proportionality parameter K.

According to the preferred embodiment schematically shown in FIG. 2, the calibration system 3 comprises the sample reflector P2. The sample reflector P2 has the same (three-dimensional) shape and geometry as the reflector P1 to be validated. The sample reflector P2 is structured so as to fulfil the predetermined quality condition requested for the validation.

The calibration system 3 comprises a light source 5, which is designed to emit a predetermined light beam F2 so as to irradiate the sample reflector body P2. The light intensity of the light beam F2 may correspond to a predetermined light intensity S2. Preferably, the light source 5 has the same photometric features as the light source (not shown) that will be mounted in the lamp.

The calibration system 3 further comprises an image capturing apparatus 6, which is designed to capture images containing the illuminated reflecting surface P2a of the reflector body P2. The image capturing apparatus 6 is configured so as to capture and provide one or more images IMG2($i$) (i is a variable index) indicative of the overall luminance LC2 of the sample reflector body P2 when it is subjected to the light beam S2. The image capturing apparatus 6 may conveniently comprise, for example, a luminance camera or a goniophotometer or any other similar image capturing device, which is capable of capturing one or more images IMG2($i$) and provide, as an output, a photometric quantity based on a processing of said image/s. Preferably, in the embodiment taken into consideration, the image capturing apparatus comprises a luminance camera to provide, as an output, a luminance LC2. The operation of the luminance camera and/or of the goniophotometer for the determination of the luminance of an object is known and, therefore, will not be described any further.

It should be pointed out that the overall luminance LC2 associated with the image/s IMG2($i$), which is provided by the image capturing apparatus 6, comprises two luminance components: a first luminance component, indicated with LS2, corresponding to the luminance that can be assigned to the light contribution of the light source 5 and a second luminance component, hereinafter referred to as reference luminance L2 corresponding to the actual luminance that may exclusively be associated with the light reflection of the sample reflector body P2.

The calibration system 3 further comprises a processing device 7, which is configured so as to: receive, as an input, one or more images IMG2($i$) provided by the image capturing apparatus 6, process the received image/s IMG2($i$) so as to determine the reference reflectance R2 and the proportionality parameter K, and provide, as an output, the reference reflectance R2 and the proportionality parameter K.

With reference to an embodiment shown in FIG. 3, the processing device 7 comprises a first processing module 7$a$, which is configured so as to process the received image/s IMG2($i$) in order to carry out a digital removal operation corresponding to a subtraction, from the image/s (namely, from the overall luminance LC2), of the first luminance component LS2 associated with the light source 5, so that the images resulting from the processing are associated with the sole reference luminance L2 (L2=LC2−LS2).

Preferably, the first processing module 7$a$ may implement a digital image post-processing program, which is configured so as to implement a digital removal function to remove, from the received image/s, the first luminance component LS2 associated with the light source 5, so as to provide processed images exclusively containing the reference luminance L2 relating to the sole contribution of the sample reflector P2.

With reference to the embodiment shown in FIG. 3, the processing device 7 further comprises a second processing module 7$b$, which is configured so as to receive the reference luminance L2 associated with the sample reflector P2, the intensity S2 of the light beam F2 of the light source 5 and a digital three-dimensional model 3DM-P2 of a reflector body corresponding to the sample reflector body P2.

The second processing module 7$b$ is further configured so as to implement a simulation program simulating the optical behaviour of the digital reflector model 3DM-P2 in a condition in which the reflector is irradiated by a virtual light beam corresponding to the light beam F2 having the light intensity S2.

The second processing module 7$b$ is further configured so as to determine, by means of the simulation program, the reflectance value R2 to be owned by the digital reflector 3DM-P2 when it is illuminated by the virtual beam, so as to have a luminance value exclusively corresponding to the reference luminance L2.

The simulation program may comprise, for example, a Ray Tracing program and determines the value of the reflectance R2 of the digital 3D reflector based on a setting of the simulator involving two binding conditions: a first condition requires the digital reflector model 3DM-P2 to be irradiated by the virtual beam corresponding to the beam F2 with light intensity S2.

The second condition entails a control of the simulation in order to allow the digital reflector to reach an actual luminance value corresponding to the reference luminance L2. This operation can be carried out, for example, by means of a "reverse" simulation process, in which the value of the variable corresponding to the reflectance R2 is determined by means of a simulation in which the reflectance represents an unknown quantity, which is determined when the simulation is in the first and second conditions described above.

With reference to an embodiment shown in FIG. 3, the processing device 7 further comprises a third processing module 7$c$, which receives, as an input from the second processing module 7$b$, the reference luminance L2 and the reflectance R2 obtained from the simulation. The processing device 7 is configured so as to determine the proportionality parameter K based on the reference luminance L2 and on the reflectance R2. According to a preferred embodiment, which is now simplified only in order to increase the clarity of the description and the comprehension of the invention, the proportionality parameter can be a numerical quantity determined by means of the following equation $$K = R2/L2 \qquad \text{a)}$$

wherein

R2 is the reflectance of the sample reflector body P2;

L2 is the reference luminance L2 of the sample reflector body P2.

It is understood that the proportionality parameter K is not limited to a numerical quantity, but it may comprise, for example, a mathematical function defining a mutual mathematical ratio between the reflectance and the luminance.

With reference to the preferred embodiment shown in FIGS. 1 and 3, the validation system 2 comprises at least one light source 10, which is designed to emit a predetermined light beam F1 to irradiate the reflecting surface of the reflector P1 to be validated. Preferably, the light beam F1 has a light intensity S1 having the same value as the light intensity S2 of the light beam F2.

In the description below and in the schematic Figures, reference will be made to a light source 10 illuminating a reflector body P1 to be validated. However, it is understood that the invention is not limited to the use of one single light source 10, but it can comprise, in addition or as an alternative, a plurality of light sources. The light sources 5 and 10 can comprise, for instance, one or more LED or OLED diodes and/or incandescent or halogen or xenon lamps or the like.

Preferably, the photometric quantities characterizing the operation of the light source 10 correspond to the ones of the light source to be mounted in the lamp in order to irradiate the reflector body P1 to be validated mounted in the lamp itself.

The validation system 2 further comprises an image capturing apparatus 11, which is arranged, relative to the reflector body P1 to be validated, so as to capture one or more images IMG1($i$) ($i$ is a variable index) containing the reflecting surface P1a of the reflector body P1 to be validated irradiated by the light beam emitted by the light source 10.

According to a preferred embodiment shown in FIG. 1, the image capturing apparatus 11 comprises a camera or a video camera 11a. Preferably, the image capturing apparatus 11 conveniently comprises, furthermore, a photopic filter 11b, which is optically coupled to the camera or video camera 11a.

The Applicant found out that the use of a camera or video camera 11a and of the photopic filter 11b, on the one hand, allows the cost of the validation system 2 to be significantly reduced and, on the other hand, makes the latter suited to be used to validate the quality of the reflector body P1 to be validated while it is moving along a production line of an industrial process for manufacturing the lamp.

According to a preferred embodiment shown in FIG. 1, the validation system 2 further comprises a processing device 12, which is designed to receive the images IMG1($i$) of the irradiated reflector body P1 to be validated, which are indicative of the overall luminance LC1 of the reflector body P1 and of the source 10.

The processing device 12 is designed to receive, as an input, the reference reflectance R2 and the proportionality parameter K and stores them in a memory module 12a.

The processing device 12 further comprises a first processing module 12b, which is configured so as to process the received image/s IMG1($i$) in order to carry out a subtraction or digital removal operation to remove, from the received image/s, namely from the overall luminance LC1, the first luminance component LS1 associated with the lights source 10, so that the resulting images/s are associated with the sole second luminance component L1 (L1=LC1−LS1) relating to the reflector body P1 to be validated.

Preferably, the first processing module 7a can implement a digital image post-processing program, which is configured so as to implement a digital removal function to remove, from the received images, the first luminance component LS1 associated with the light source 10, so as to provide processed images exclusively associated with the luminance L1 of the reflector body P1 to be validated.

The processing device 12 further comprises a second processing module 12c, which is configured so as to receive the luminance L1 of the reflector body P1 to be validated and the proportionality parameter K. The second processing module 12c is further configured so as to determine the reflectance R1 of the reflector body P1 to be validated based on the luminance L1 and on the proportionality parameter K, Preferably, the reflectance R1 of the reflector body P1 to be validated is determined by means of the following equation:

$$R1 = K*L1 \qquad \text{b)}$$

The processing device 12 further comprises a third processing module 12d, which is configured so as to receive, as an input, the reflectance R1 of the reflector body P1 to be validated and the stored reference reflectance R2. The third processing module 12d is further configured so as to compare the reflectance R1 with the reflectance R2 and determines the quality condition based on the result of the comparison.

According to an explanatory embodiment, the third processing module 12d determines the quality condition when the reflectance R1 is greater than or equal to the reflectance R2.

Obviously, the third processing module 12d is further configured so as to compare the reflectance R1 with the reflectance R2 and determines a non-quality condition based on the result of the comparison. For example, the third processing module 12d determines the non-quality condition when the reflectance R1 is smaller than the reflectance R2.

The third processing module 12d is further configured so as to provide a control signal COM indicative of the quality condition or of the non-quality condition.

With reference to FIGS. 1 and 3, the control system 1 can further comprise a separation system 20, which is designed to receive the control signal COM from the third processing module 12d and removes the reflector body P1 from a transport production line 21 when the control signal COM is indicative of the fact that the reflector body P1 to be validated does not have the quality condition. In the example shown in FIG. 3, the separation system 20 comprises a robotic system 20a, which removes the reflector body P1 from a transport production line 21 and deposits it, for example, in a rejection store 22.

Figure 4:
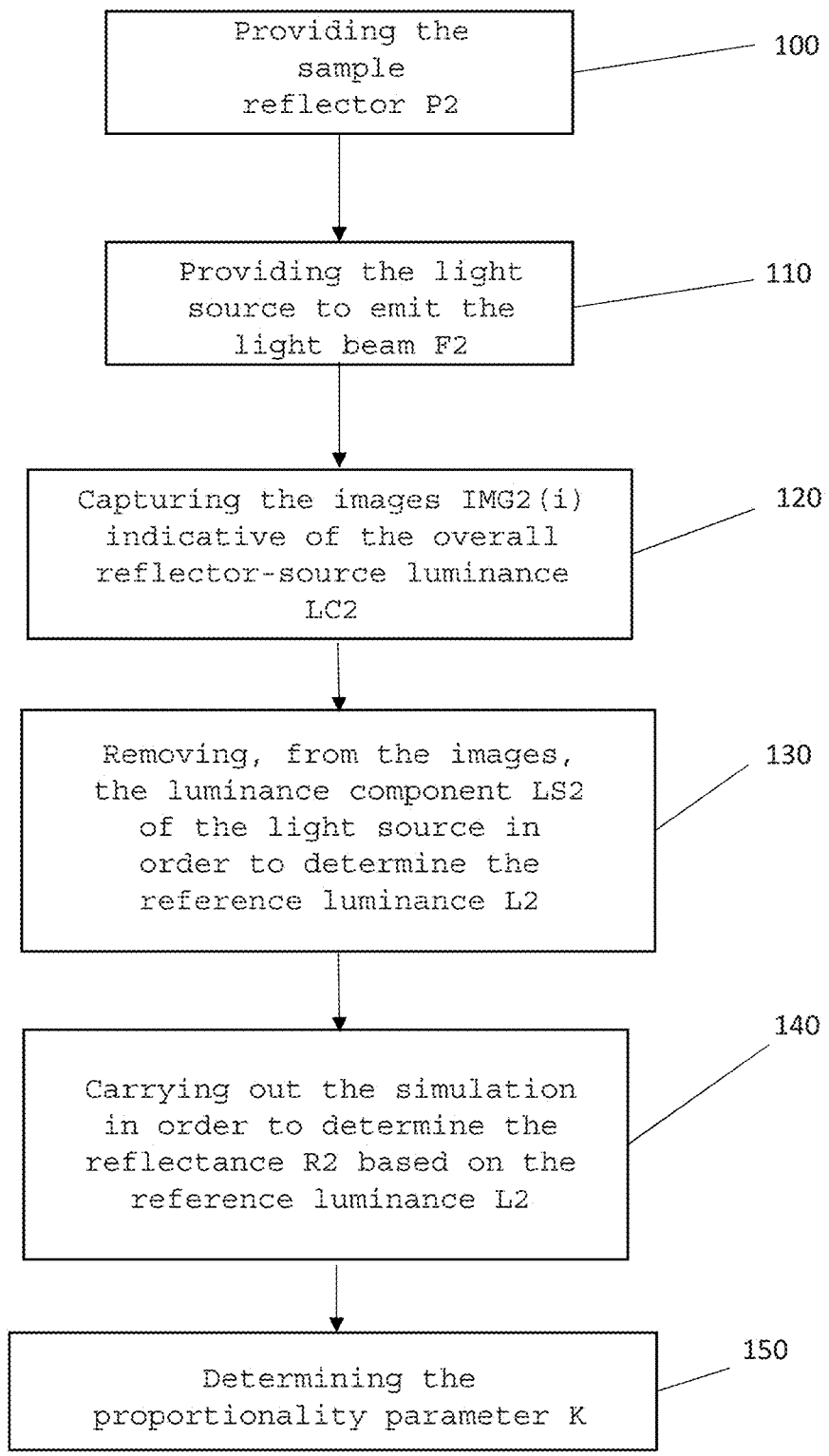
FIG. 4 is a flow diagram of the operations implemented by the adjustment method implemented by the reflector quality control method according to the invention.
Figure 5:
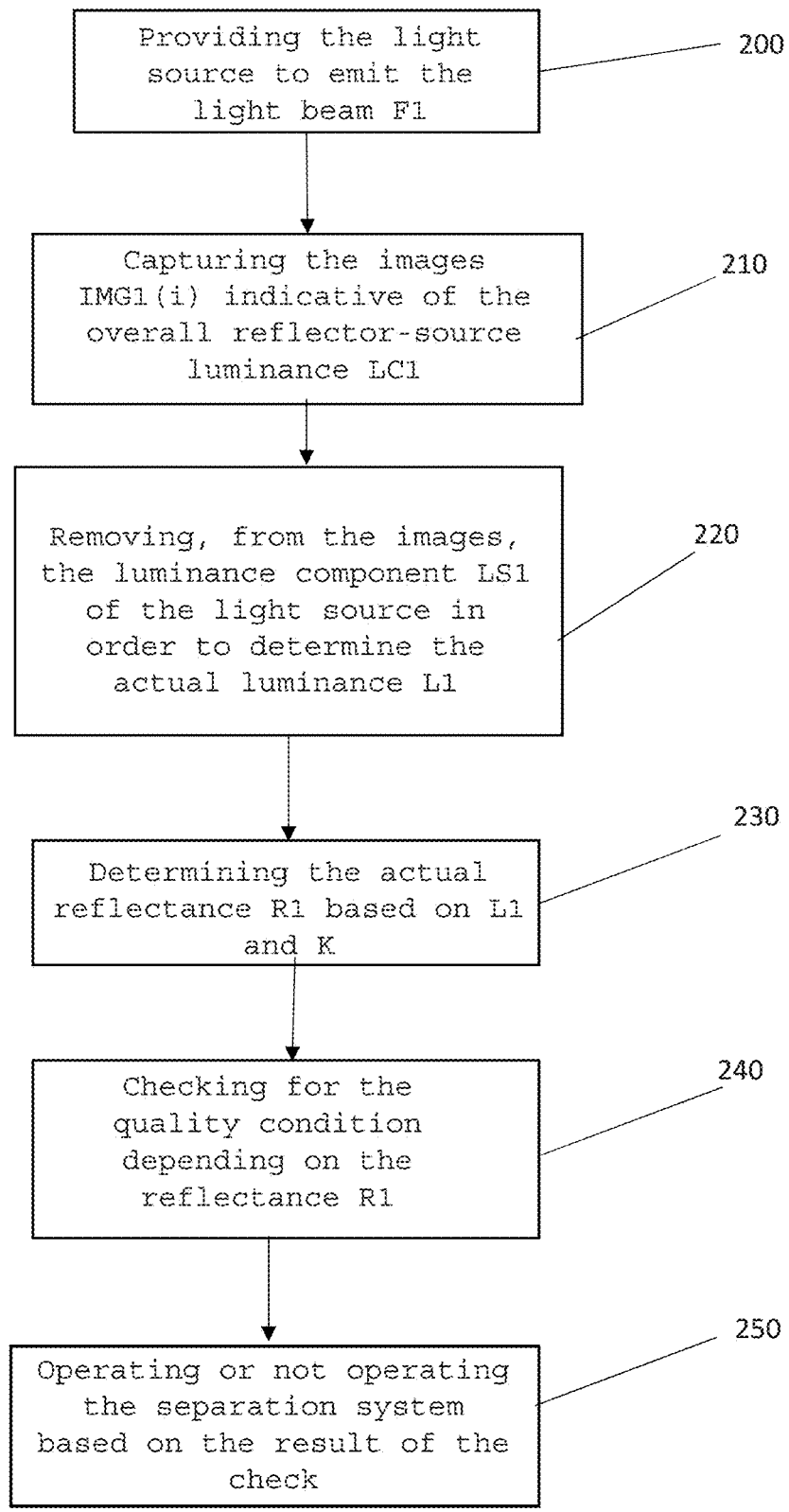
FIG. 5 is a flow diagram of the operations implemented by the method to validate the quality of a reflector comprised in the method to control the quality of the reflector according to the invention.

FIGS. 4 and 5 show flow diagrams of the operations implemented by the method to control the quality of the reflector body P1 to be validated. The control method comprises a calibration method and a validation method for the reflector body P1.

With reference to FIG. 4, the calibration method comprises the step of providing the sample reflector P2 (block 100), which fulfils the quality condition requested for the validation.

The calibration method comprises the step of providing the light source 5 to emit the predetermined light beam F2 so as to irradiate said sample reflector body P2 (block 110).

The calibration method further comprises the step of capturing, by means of the image capturing apparatus 6, one or more images indicative of the overall luminance LC2 of the sample reflector P2 and of the source 5 (block 120).

The calibration method further comprises the step of processing the received image/s so as to subtract (remove) the first luminance component LS2 associated with the light source 5 from the image/s, in order to obtain images containing the sole reference luminance L2 of the sample reflector P2 (block 130).

The calibration method further comprises the step of implementing the simulation program simulating the optical behaviour of the digital reflector model 3DM-P2 in a condition in which the reflector is irradiated by a light beam corresponding to the light beam F2 having the light intensity S2 (block 140).

The method determines, through the simulation program, the reflectance value R2 that the digital reflector model 3DM-P2 should have when it is illuminated by the light beam F2 in order to have the reference luminance L2.

The calibration method further comprises the step of determining the multiplying parameter K based on the reference luminance L2 and on the reflectance R2 (block 150).

With reference to FIG. 5, the validation method comprises the step of providing the light source 10 to emit a predetermined light beam F1 in order to irradiate the reflecting surface Pla of the reflector body P1 to be validated (block 200).

The validation method further comprises the step of capturing, by means of the image capturing apparatus 11, one or more images IMG1($i$) containing the reflecting surface Pla of the reflector body P1 to be validated irradiated by the light beam emitted by the light source 10 (block 210).

The validation method further comprises the step of processing the received image/s so as to subtract (remove), from the received images/s, the luminance LS1 associated with the light source 10, in order to obtain an image or images containing the sole actual luminance L1 of the reflector body P1 to be validated (block 220).

Preferably, during this step, a digital post-processing program is implemented in order to subtract (remove) the luminance LS1 associated with the light source 10 from the received image/s, so as to obtain an image containing the sole actual luminance L1 of the reflector body P1 to be validated.

The method further comprises the step of determining the actual reflectance R1 of the reflector body P1 to be validated based on the actual luminance L1 and on the proportionality parameter K. Preferably, the actual reflectance R1 of the reflector body P1 to be validated is determined by means of the following equation:

$$R1=K*L1$$

The method further comprises the step of comparing the actual reflectance R1 with the reference reflectance R2 and of determining the quality condition based on the result of the comparison (block 240). Preferably, during this step, the quality condition is determined when the actual reflectance R1 is greater than or equal to the reference reflectance R2. Preferably, during this step, the actual reflectance R1 is compared with the reference reflectance R2 in order to determine a non-quality (fault) condition based on the result of the comparison.

The validation method further comprises the step of controlling the separation system 20 so as to remove the reflector body P1 to be validated from the transport production line 21 when the reflector body P1 to be validated does not have the quality condition (block 250).

The system is advantageous for it can be applied to a production line in order to determine the quality of the reflectors in a quick and accurate manner. In particular, thanks to the initial adjustment, which allows the proportionality parameter to be determined, it is possible to determine, in an indirected manner, the actual reflectance of the reflector based on a parameter than can objectively be determined in line, namely the luminance of the reflector.

Furthermore, the use of the camera with the photopic filter allows the system to be simplified, reducing the costs thereof, and makes the system usable for in-line controls.

Finally, the system and the method to control the quality of a reflector of a lamp for motor vehicles described and disclosed above can clearly be subjected to changes and variants, without for this reason going beyond the scope of protection of the invention defined in the appended claims.

Figure 6:
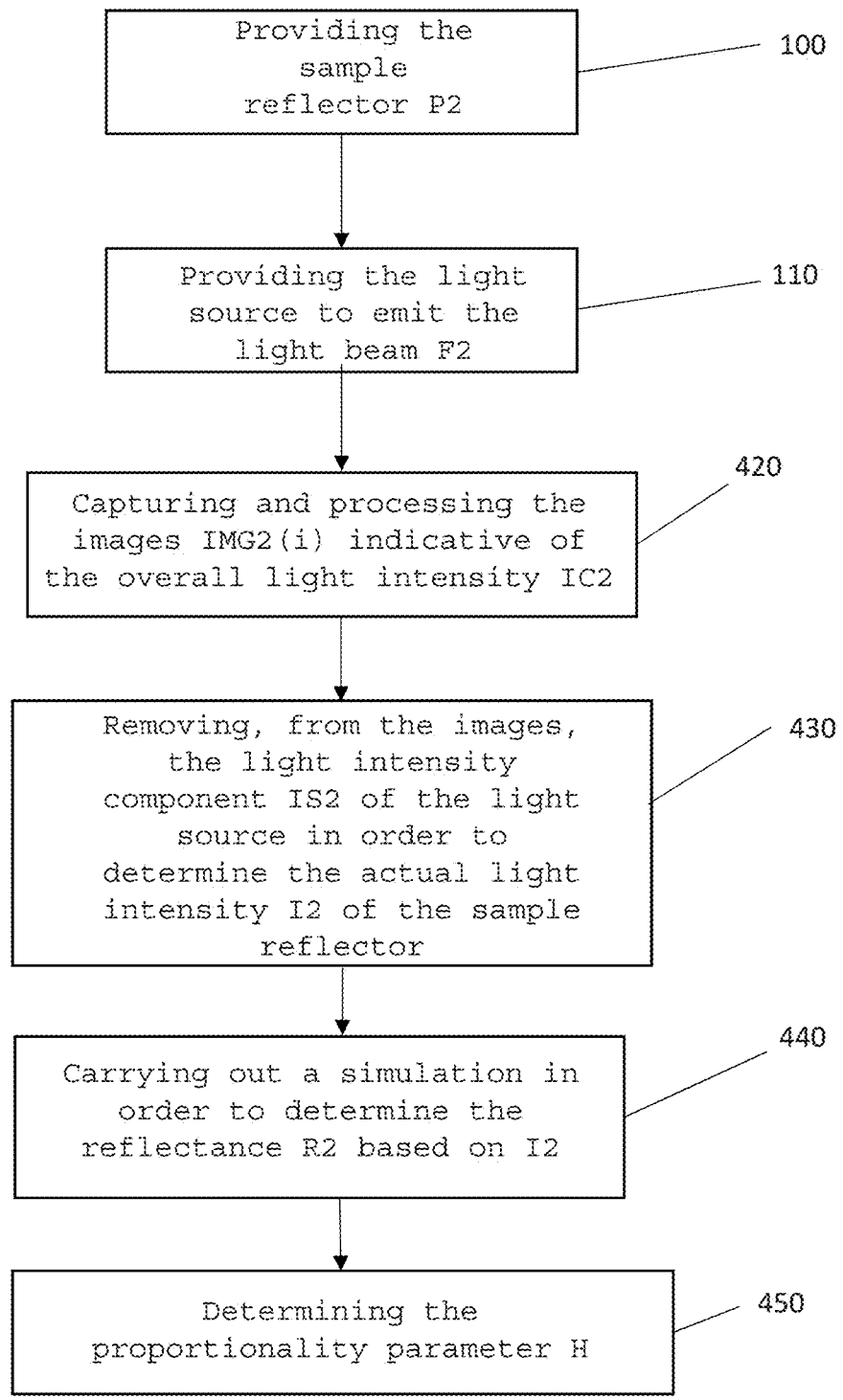
FIG. 6 is a flow diagram of the operations implemented by the adjustment method implemented by the reflector quality control method according to a variant of the invention.
Figure 7:
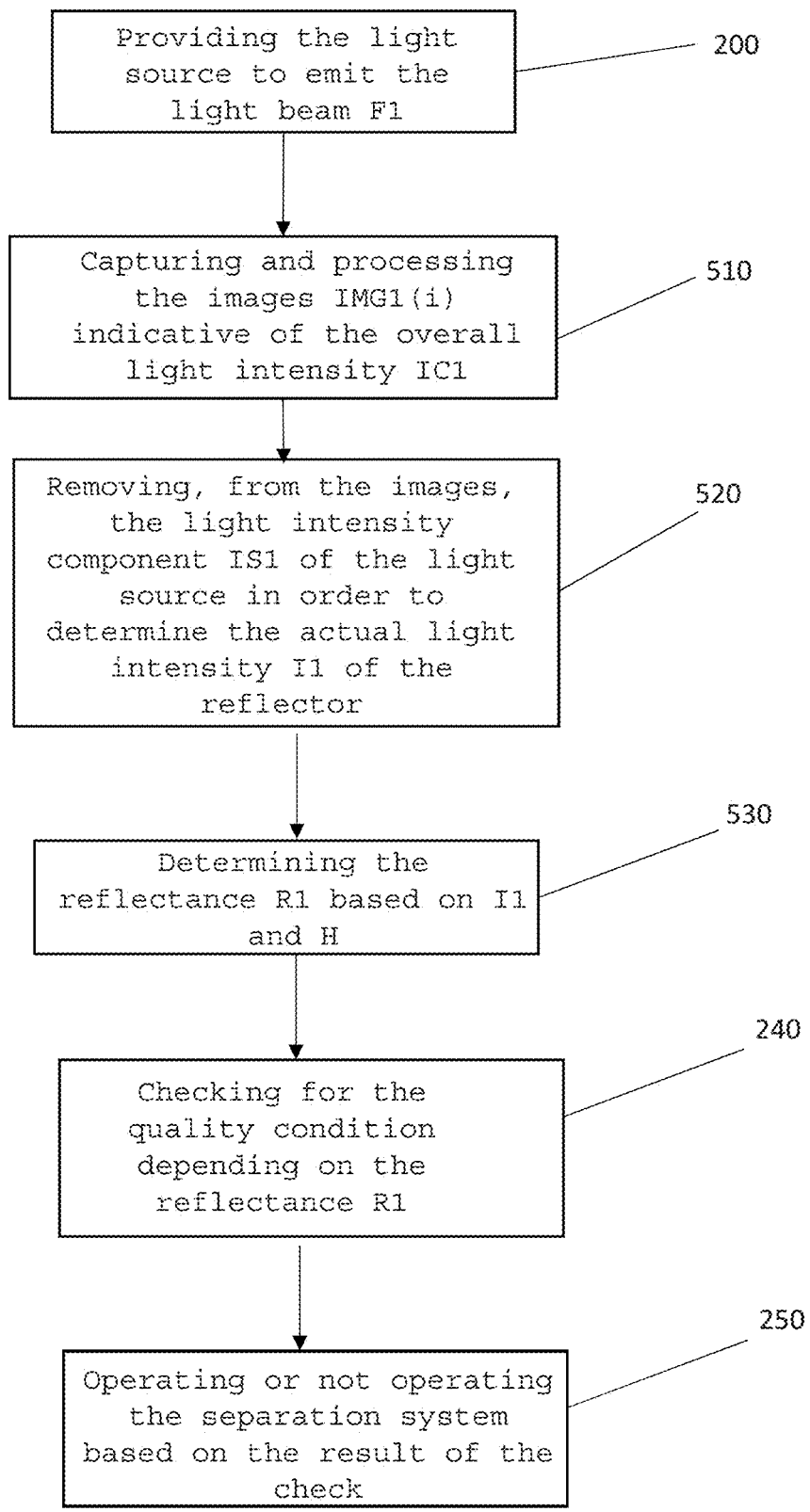
FIG. 7 is a flow diagram of the operations implemented by the method to validate the quality of a reflector comprised in the method to control the quality of the reflector according to a variant of the invention.

According to a variant shown in FIGS. 6 and 7, in the method, the reference reflectance R2 of the sample reflector P2 and/or the actual reflectance R1 of the reflector P1 to be validated, instead of being determined based on the luminance L1 and L1, respectively, are determined based on the light intensity I1 and I1, respectively, of the light reflected by the sample reflector P2 and by the reflector P1 to be validated.

In particular, the embodiment shown in FIGS. 6 and 7 relates to a method to control the quality of a lamp reflector body P1 to be validated, which is similar to the method described above with reference to the flow diagrams shown in FIGS. 4 and 5 and whose operating blocks, when possible, are identified by the same reference numbers identifying corresponding operating blocks of the method described above with reference to FIGS. 4 and 5.

The method described in the flow diagram of FIG. 6 differs from the method described in the flow diagram of FIG. 4 in that blocks 420, 430, 440 and 450 of FIG. 6 replace blocks 120, 130, 140 and 150 of FIG. 4, respectively.

Furthermore, the method described in the flow diagram of FIG. 7 differs from the method described in the flow diagram of FIG. 5 in that blocks, 510, 520 and 530 of FIG. 7 replace blocks 210, 220 and 230 of FIG. 5.

In particular, with reference to FIG. 6, in block 420, the method entails capturing, by means of the image capturing apparatus 6, one or more images indicative of the overall intensity 102 of the sample reflector P2 irradiated by the light beam F2.

In block 430, the method further comprises the step of processing the received image/s so as to subtract (remove) the first light intensity component IS2 associated with the light source 5 from the received image/s, in order to obtain images solely containing a second light intensity component corresponding to the reference intensity I2 of the sample reflector P2.

In block 440, the calibration method further comprises the step of implementing the simulation program simulating the optical behaviour of the digital reflector model 3DM-P2 in a condition in which the reflector is irradiated by a light beam corresponding to the light beam F2 having the light intensity S2.

The method determines, through the simulation program, the reflectance value R2 that the digital 3D reflector should have when it is illuminated by the light beam F2 in order to have a reflection with light intensity I2.

In block 450, the calibration method further comprises the step of determining the multiplying parameter H based on the reference light intensity I2 and on the reflectance R2. The multiplying parameter H is determined through the equation H=R2/I2.

With reference to FIG. 7, in block 510, the validation method comprises the step of capturing, by means of the image capturing apparatus 11, a series of images IMG1(i) containing the reflecting surface Pla of the reflector body P1 to be validated irradiated by the light beam emitted by the light source 10 and indicative of the overall intensity IC1 of the reflector body P1 to be validated and of the light source 10.

In block 520, the validation method comprises the step of processing the received images IMG1(i) so as to subtract (remove) a first light intensity component IS1 associated with the light source 10 from the received image, in order to obtain an image solely containing a second light intensity component corresponding to the actual intensity I1 of the reflector body P1 to be validated. Preferably, during this step, a digital post-processing program is implemented in order to subtract (remove) the first light intensity component IS1 associated with the light source 10 from the received images, so as to obtain an image containing the sole actual light intensity I1 of the reflector body P1 to be validated.

In block 530, the calibration method further comprises the step of determining the reflectance R1 of the reflector body P1 to be validated based on the actual light intensity I1 and on the proportionality parameter H. Preferably, the actual reflectance R1 of the reflector body P1 to be validated is determined by means of the following equation:

$$R1 = H * I1.$$

Obviously, the operations of the validation method described in the flow diagram of FIG. 5 are implemented by a validation system (not shown) which is similar to the validation system shown in FIGS. 1 and 3 and is provided with a processing device which differs from the processing device 12 described above in that it determines and stores a proportionality parameter H, determines the actual light intensity I1 of the reflector body P1 to be validated based on the processing of the images IMG1(i), determines the actual reflectance R1 of the reflector body P1 to be validated based on said actual light intensity I1 and on the proportionality parameter H.

The processing device according to this variant further differs from the processing device 12 in that it carries out a digital removal operation to remove, from the image/s IMG1(i), a first light intensity component IS1 associated with the light source 10, so as to determine the actual light intensity I1 of the reflector body P1 to be validated.

Furthermore, obviously, the operations of the calibration method described in the flow diagram of FIG. 6 are implemented by an calibration system (not shown) which is similar to the calibration system shown in FIG. 2 and is provided with a processing device which differs from the processing device 7 described above in that it determines a reference light intensity I2 based on the image/s IMG2(i) and determines the reference reflectance R2 based on said reference light intensity I2.

The processing device of the adjustment system according to this variant further differs from the processing device 7 in that it is configured so as to carry out a digital removal operation to remove, from the image/s IMG2(i), a first light intensity component IS2 associated with the light source 5, so as to determine said reference intensity I2.

The processing device of the adjustment system according to this variant further differs from the processing device 7 in that it is configured so as to determine the reference reflectance R2 through the implementation of a simulation program simulating the optical behaviour of a virtual three-dimensional model of the sample reflector body P based on the reference light intensity I2 and on the light beam F2 emitted by the light source 5.

The invention claimed is:

1. A control system (1) to control the quality of a reflector body (P1) of a lamp of a motor vehicle, the control system comprising:
   a validation system (2) to validate the quality of the reflector body comprising:
   at least one first light source (10), which has the same photometric characteristics as the light source to be mounted in the lamp of the motor vehicle and is designed to emit a first predetermined light beam to irradiate the reflecting surface (Pla) of said reflector body (P1),
   an image capturing apparatus (11), which is arranged so as to capture one or more first images (IMG1(i)) containing the irradiated reflecting surface of said reflector body (P1),
   a calibration system (3) comprising: (i) a sample reflector body (P2), (ii) at least one second light source (5), which is designed to emit a predetermined light beam (F2) so as to irradiate said sample reflector body (P2), (iii) an image capturing apparatus (6), which is arranged so as to capture one or more second images (IMG2(i)) containing the irradiated reflecting surface (P2a) of said sample reflector body (P2), (iv) a first processing device (7), which is configured so as to process said one or more second images (IMG2(i)) in order to determine said reference reflectance (R2) and said first proportionality parameter (K), to determine a reference luminance (L2) based on said second images (IMG2(i)), to determine said reference reflectance (R2) based on said reference luminance (L2), to carry out a digital removal operation to remove, from said one or more second images (IMG2(i)), a first luminance component (LS2) associated with said second light source (5), so as to determine said reference luminance (L2), and to determine said reference reflectance (R2) through the implementation of a simulation program simulating of the optical behaviour of a virtual three-dimensional model of said sample reflector body (P2) based on said reference luminance (L2) and on the second light beam (F2) emitted by said second light source (5),
   a second processing device (12), which is configured so as to:
     process said one or more first images (IMG1(i)) in order to determine the actual reflectance (R1) of the reflector body (P1),
     determine a quality condition of said reflector body (P1) to be validated based on said actual reflectance (R1),
   wherein said second processing device (12) is configured so as to:
     determine said quality condition of the reflector body (P1) based on a comparison between said actual reflectance (R1) and a reference reflectance (R2),
     store a first proportionality parameter (K),
     determine the actual luminance (L1) of said reflector body (P1) based on the processing of said first images (IMG1(i)),
     determine said actual reflectance (R1) of said reflector body (P1) based on said actual luminance (L1) and on said first proportionality parameter (K).

2. The control system according to claim 1, wherein said second processing device (12) is further configured so as to carry out a digital removal operation to remove, from said first images (IMG1(*i*)), a first luminance component (LS1) associated with said first light source (10), so as to determine said actual luminance (L1).

3. The control system according to claim 1, wherein said second processing device (12) is further configured so as to:
   store a proportionality parameter (H),
   determine the actual light intensity (I1) of said reflector body (P1) based on the processing of said first images (IMG1(*i*)),
   determine said actual reflectance (R1) of said reflector body (P1) based on said actual light intensity (I1) and on said proportionality parameter (H).

4. The control system according to claim 3, wherein said second processing device (12) is further configured so as to carry out a digital removal operation to remove, from said one or more first images (IMG1(*i*)), a first light intensity component (IS1) associated with said first light source (10), so as to determine said actual light intensity (I1).

5. The control system according to claim 1, wherein said first processing device (7) is further configured so as to:
   determine a reference light intensity (I2) based on said one or more second images (IMG2(*i*)),
   determine said reference reflectance (R2) based on said reference light intensity (I2).

6. The control system according to claim 5, wherein said first processing device (7) is further configured so as to carry out a digital removal operation to remove, from said one or more second images (IMG2(*i*)), a first light intensity component (IS2) associated with said second light source (5), so as to determine said reference light intensity (I2).

7. A control system to control the quality of a reflector body (P1) of a lamp of a motor vehicle, the control system comprising:
   a validation system (2) to validate the quality of the reflector body comprising:
   at least one first light source (10), which has the same photometric characteristics as the light source to be mounted in the lamp of the motor vehicle and is designed to emit a first predetermined light beam to irradiate the reflecting surface (Pla) of said reflector body (P1),
   a calibration system (3) comprising: (i) a sample reflector body (P2), (ii) at least one second light source (5), which is designed to emit a predetermined light beam (F2) so as to irradiate said sample reflector body (P2), (iii) an image capturing apparatus (6), which is arranged so as to capture a series of second images (IMG2(*i*)) containing the irradiated reflecting surface (P2*a*) of said sample reflector body (P2), (iv) a first processing device (7), which is configured so as to process said one or more second images (IMG2(*i*)) in order to determine said reference reflectance (R2) and said second proportionality parameter (H), (v) determine a reference light intensity (I2) based on said one or more second images (IMG2(*i*)), and (vi) determine said reference reflectance (R2) based on said reference light intensity (I2),
   an image capturing apparatus (11), which is arranged so as to capture one or more first images (IMG1(*i*)) containing the irradiated reflecting surface of said reflector body (P1),
   a second processing device (12), which is configured so as to:
      process said one or more first images (IMG1(*i*)) in order to determine the actual reflectance (R1) of the reflector body (P1),
      determine a quality condition of said reflector body (P1) to be validated based on said actual reflectance (R1)
      determine said quality condition of the reflector body (P1) based on a comparison between said actual reflectance (R1) and a reference reflectance (R2)
      store a proportionality parameter (H),
      determine the actual light intensity (I1) of said reflector body (P1) based on the processing of said first images (IMG1(*i*)),
      determine said actual reflectance (R1) of said reflector body (P1) based on said actual light intensity (I1) and on said proportionality parameter (H),
      carry out a digital removal operation to remove, from said one or more first images (IMG1(*i*)), a first light intensity component (IS1) associated with said first light source (10), so as to determine said actual light intensity (I1)
      carry out a digital removal operation to remove, from said one or more second images (IMG2(*i*)), a first light intensity component (IS2) associated with said second light source (5), so as to determine said reference light intensity (I2),
   wherein said second processing device (7) is further configured so as to determine said reference reflectance (R2) through the implementation of a simulation program simulating of the optical behaviour of a virtual three-dimensional model of said sample reflector body (P2) based on said reference light intensity (I2) and on the second light beam (F2) emitted by said second light source (5).

8. A control system (1) to control the quality of a reflector body of a lamp of a motor vehicle, the control system comprising:
   a validation system (2) to validate the quality of the reflector body comprising:
   a sample reflector body (P1);
   at least one first light source (10) mounted inside the sample reflector body (P1), which has the same photometric characteristics as the light source to be mounted in the lamp of the motor vehicle and is designed to emit a first predetermined light beam to irradiate the reflecting surface (Pla) of said reflector body (P1),
   an image capturing apparatus (11), which is arranged so as to capture one or more first images (IMG1(*i*)) containing the irradiated reflecting surface of said reflector body (P1),
   a processing device (12), which is configured so as to:
      process said one or more first images (IMG1(*i*)) in order to determine the actual reflectance (R1) of the reflector body (P1),
      determine a quality condition of said reflector body (P1) to be validated based on said actual reflectance (R1).

* * * * *